United States Patent
Sakamoto et al.

(10) Patent No.: US 12,072,604 B2
(45) Date of Patent: Aug. 27, 2024

(54) CONTROL METHOD OF OPTICAL DEFLECTOR, AND OPTICAL DEFLECTION DEVICE

(71) Applicant: Nippon Telegraph and Telephone Corporation, Tokyo (JP)

(72) Inventors: Takashi Sakamoto, Tokyo (JP); Yuichi Akage, Tokyo (JP); Tadayuki Imai, Tokyo (JP); Masahiro Ueno, Tokyo (JP); Sohan Kawamura, Tokyo (JP); Soichi Oka, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 499 days.

(21) Appl. No.: 17/605,049

(22) PCT Filed: Apr. 8, 2020

(86) PCT No.: PCT/JP2020/015811
§ 371 (c)(1),
(2) Date: Oct. 20, 2021

(87) PCT Pub. No.: WO2020/217991
PCT Pub. Date: Oct. 29, 2020

(65) Prior Publication Data
US 2022/0187678 A1 Jun. 16, 2022

(30) Foreign Application Priority Data
Apr. 23, 2019 (JP) .................. 2019-082041

(51) Int. Cl.
*G02F 1/31* (2006.01)

(52) U.S. Cl.
CPC ..................... *G02F 1/31* (2013.01)

(58) Field of Classification Search
CPC ........................................ G02F 1/31
USPC ........................................ 359/245
See application file for complete search history.

(56) References Cited

U.S. PATENT DOCUMENTS

2017/0358899 A1  12/2017  Toyoda et al.

FOREIGN PATENT DOCUMENTS

| JP | 6193773 B2 | 9/2017 |
| JP | 2017203847 A | 11/2017 |
| JP | 2017219732 A | 12/2017 |

*Primary Examiner* — William Choi
(74) *Attorney, Agent, or Firm* — Slater Matsil, LLP

(57) ABSTRACT

The present invention includes an optical deflector that changes a deflection angle depending on an applied voltage, a voltage control unit that applies a voltage to the optical deflector, and a storage unit that stores a value of a voltage to be output by the voltage control unit. The voltage control unit outputs a voltage of a value stored in the storage unit to the optical deflector. The storage unit stores a goal voltage $V=g_{goal}(t)$, which provides a deflection angle $\theta$ with the goal time dependency $\theta=\theta_{goal}(t)$.

6 Claims, 19 Drawing Sheets

CONTROL METHOD OF OPTICAL DEFLECTOR, AND OPTICAL DEFLECTION DEVICE

CROSS-REFERENCE TO RELATED APPLICATIONS

This application is a national phase entry of PCT Application No. PCT/JP2020/015811, filed on Apr. 8, 2020, which claims priority to Japanese Application No. 2019-082041, filed on Apr. 23, 2019, which applications are hereby incorporated herein by reference.

TECHNICAL FIELD

The present invention relates to a method for controlling an optical deflector and an optical deflection device.

BACKGROUND

Optical deflectors that change the direction of travel of light by applying an alternating voltage such as a sine wave to a dielectric (electro-optical material) in a paraelectric phase are used in various fields such as laser printers, wavelength sweep light sources, and the like. For example, a wavelength sweep light source in which an electro-optical crystal in a paraelectric phase (dielectric crystal of a paraelectric phase) is disposed in an optical resonator has been proposed (see PTL 1). The wavelength sweep light source superimposes a DC voltage to fill a trap in electro-optical crystals with electrons as a bias voltage in applying an AC voltage for fast deflection to the electro-optical crystal. The wavelength sweep light source configured in this manner can suppress fluctuations in the light output, the sweep wavelength band, and the coherence length over an extended period of time, and has excellent long-term stability.

Techniques have been proposed for applying an AC drive voltage in which a DC voltage is superimposed as a bias voltage while irradiating the electro-optical crystal with light from an optical irradiation unit (see PTL 2). In this proposal, it is believed that electron injection into the trap within the electro-optical crystal can reduce the time to reach a steady state. It is also believed that optical deflectors using electro-optical materials will also be applied in the future in laser processing and the like other than the fields described above.

KTN ($KTa_{1-x}Nb_xO_3$) or KLTN ($K_{1-y}Li_yTa_{1-x}Nb_xO_3$) having a large electro-optical effect are known as electro-optical crystals having the above-described characteristics. Hereinafter, in a case where there is no need to distinguish between KTN and KLTN, these are collectively referred to as KTN. Furthermore, in a case where Ti or Cr material is used as an electrode, the charge can be injected into the KTN, and the internal electric field generated by the injected charge can be used to achieve a high speed and wide angle optical deflector.

FIG. 11 illustrates a configuration of a conventional optical deflector using KTN crystals (see PTL 3). FIG. 11 illustrates a configuration viewed from the incident direction of light. The KTN crystal 11 is sandwiched, at the top surface and the bottom surface, and is held by two metal blocks (electrode blocks) 13a and 13b, between a graphite sheet 12a and a graphite sheet 12b. An electrode pair (not illustrated) including a positive electrode and a negative electrode for applying a control voltage is formed on the opposing upper and lower surfaces of the KTN crystal 11, and are electrically connected to a control voltage source via the graphite sheets 12a and 12b and the metal blocks 13a and 13b in contact. The application of a voltage from a control voltage source not illustrated, and electron injection into the KTN crystal 11 generate an electric field within the KTN crystal 11 and generate a refractive index distribution within the KTN crystal 11. An optical axis of incident light is set orthogonal to the direction of the electric field, and a voltage is applied between the pair of electrodes to deflect incident light.

The graphite sheets 12a and 12b are inserted to prevent the KTN crystal 11 from breaking due to vibration in a case of applying a high frequency control voltage to the KTN crystal 11. Aluminum nitrides (AlNs) 14a and 14b are inserted on both sides of the KTN crystal 11. The function of the AlNs 14a and 14b is to serve as a heat transfer member for positioning the KTN crystal 11 and for maintaining the temperature of the two metal blocks 13a and 13b uniform. A Peltier element 16 is disposed between the metal block 13a and a support plate 15, and thermistors (temperature detection units) 17a and 17b are embedded within the metal blocks 13a and 13b, respectively.

A temperature control device 18 detects temperature by the thermistors 17a and 17b and heats or cools the metal block 13a by the Peltier element 16 to maintain the KTN crystal 11 at the appropriate set temperature (constant temperature). The temperature control device 18 detects the temperature by measuring the resistance value of the thermistor 17a and the thermistor 17b connected in series, and keeps the dielectric constant of the KTN crystal 11 constant.

CITATION LIST

Patent Literature

PTL 1: JP 6193773 B
PTL 2: JP 2017-219732 A
PTL 3: JP 2017-203847 A.

SUMMARY

Technical Problem

Generally, light has an intensity distribution in a cross section perpendicular to the direction of travel, but hereinafter the centroid of this intensity distribution will be referred to as the centroid position of the light or simply the position of the light. Depending on the field of application of the optical deflector, it is required that the centroid position of the light deflected by the optical deflector have desired time dependency. For example, two optical deflectors can be connected in series to deflect the light in a circular manner. In this way, in a case of deflecting the light along a circle of radius A, the centroid position of the light deflected by each optical deflector is required to have time dependency such as $x = A \cos(\omega t + B)$, $y = A \sin(\omega t + B)$. Here, each of x and y is an orthogonal coordinate axes, $\omega$ is the angular frequency, t is the time, and B is the initial phase. As described in Patent Literatures 1, 2, and 3, it is known to apply an AC voltage (alternating voltage) to an electro-optical crystal. However, even in a case where a sine wave voltage is applied as a voltage, it is not clear whether the time dependency of the position of the deflected light beam is represented by a sine wave (shows a simple harmonic motion).

Embodiments of the present invention are made to solve the problems described above, and an object of embodiments of the present invention is to make the position (trajectory) of light deflected by an optical deflector to have desired time dependency.

Means for Solving the Problem

A method for controlling an optical deflector according to embodiments of the present invention is a method for controlling an optical deflector that changes a deflection angle depending on a voltage to be applied, the method for controlling the optical deflector deriving a goal voltage $V=g_{goal}(t)$ for providing a deflection angle $\theta$ with goal time dependency $\theta=\theta_{goal}(t)$ when time is denoted by t, the method including: an initial step in which in a case where $\theta$ is a periodic function of time, a period is denoted by T, in a case where $\theta$ is not a periodic function of time, a duration is denoted by T and a start time of the deflection angle with the goal time dependency $\theta=\theta_{goal}(t)$ is set as t=0, and when time in a period $0 \le t < T$ is considered, the number of repetitions is set as n=0; an increment step of setting n=n+1; a step $A_n$ of applying a voltage $g_n(t)$ with the period T or the duration T to the optical deflector; a step $B_n$ of checking whether $\theta=\theta_{goal}(t)$ is satisfied with a goal accuracy, next to the step $A_n$; a step $C_n$ of setting $g_n(t)$ as a goal voltage; a step $D_n$ of deriving a relationship of voltage dependency $\theta=f_n(V)$ of the deflection angle; a step $E_n$ of setting $g_{n+1}(t)=f_n^{-1}\{\theta_{goal}(t)\}$, next to the step $D_n$; and a step $F_n$ of performing the increment step next to the step $E_n$, wherein the step $A_n$ is subsequent to the increment step, in the step $B_n$, in a case where $\theta=\theta_{goal}(t)$ is not satisfied with the goal accuracy, the step $D_n$ is performed following the step $B_n$, in the step $B_n$, in a case where $\theta=\theta_{goal}(t)$ is satisfied with the goal accuracy, the step $C_n$ is performed following the step $B_n$ and a process is ended, and the voltage dependency of the deflection angle depends on the time dependency of the applied voltage. In one configuration example of the method for controlling the optical deflector described above, the optical deflector is constituted of an electro-optical material with a trap in a paraelectric phase and being for accumulating charge within the material, and an optical axis of incident light on the optical deflector is set orthogonal to a direction of an electric field of the voltage applied to the optical deflector, and the voltage is applied to the optical deflector to deflect incident light incident on the optical deflector. In one configuration example of the method for controlling the optical deflector described above, the electro-optical material is either KTN [$KTa_{1-\alpha}Nb_\alpha O_3$ ($0<\alpha<1$)] crystals or KLTN [$K_{1-\beta}Li_\beta Ta_{1-\alpha}Nb_\alpha O_3$ ($0<\alpha<1$, $0<\beta<1$)] crystals with lithium being added.

An optical deflection device according to embodiments of the present invention includes: an optical deflector configured to change a deflection angle depending on a voltage to be applied; a voltage control unit configured to apply the voltage to the optical deflector; and a storage unit configured to store a value of a voltage output by the voltage control unit, wherein the storage unit stores a goal voltage for providing a deflection angle with goal time dependency, and the goal voltage is determined by the method according to claim 1.

In one configuration example of the optical deflection device described above, the optical deflector is constituted of an electro-optical material with a trap in a paraelectric phase and being for accumulating charge within the material, and an optical axis of incident light on the optical deflector is set orthogonal to a direction of an electric field of the voltage applied to the optical deflector, and the voltage is applied to the optical deflector to deflect incident light incident on the optical deflector. In one configuration example of the optical deflection device described above, the electro-optical material is either KTN [$KTa_{1-\alpha}Nb_\alpha O_3$ ($0<\alpha<1$)] crystals or KLTN [$K_{1-\beta}Li_\beta Ta_{1-\alpha}Nb_\alpha O_3$ ($0<\alpha<1$, $0<\beta<1$)] crystals with lithium being added.

Effects of Embodiments of the Invention

As described above, according to embodiments of the present invention, the step of applying $g_n(t)$ configured by $g_{n+1}(t)=f_n^{-1}\{\theta_{goal}(t)\}$ to the optical deflector to achieve $\theta=\theta_{goal}(t)$ is repeated until $\theta=\theta_{goal}(t)$ indicating the time dependency of the deflection angle is satisfied with the goal accuracy, so that the position (trajectory) of the light deflected by the optical deflector has the desired time dependency.

DETAILED DESCRIPTION OF ILLUSTRATIVE EMBODIMENTS

Figure 1:
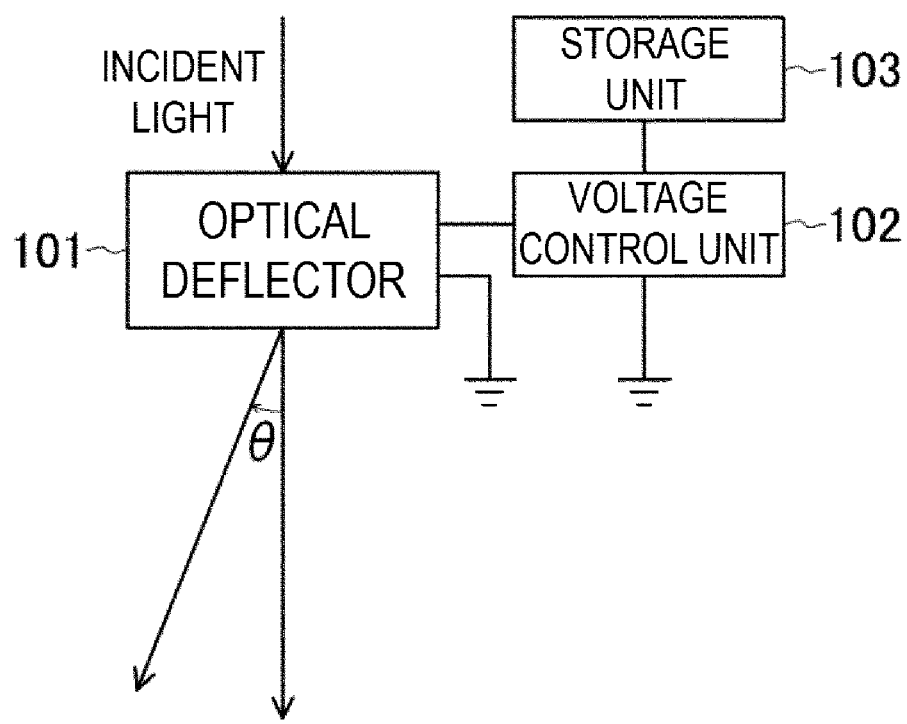
FIG. 1 is a configuration diagram illustrating a configuration of an optical deflection device according to an embodiment of the present invention.

Hereinafter, an optical deflection device according to an embodiment of the present invention will be described with reference to FIG. 1. The optical deflection device includes an optical deflector 101 that changes the deflection angle depending on an applied voltage, a voltage control unit 102 that applies a voltage to the optical deflector 101, and a storage unit 103 that stores a value of a voltage to be output by the voltage control unit 102. The voltage control unit 102 outputs the voltage of the value stored in the storage unit 103 to the optical deflector 101. The storage unit 103 stores a voltage $V=g_{goal}(t)$ such that the trajectory of the output light has desired time dependency. Details will be described below. The voltage control unit 102 is connected to an electrode block (not illustrated) of the optical deflector 101. The trajectory of the light output from the optical deflector 101 has the desired time dependency, by driving at the voltage from the voltage control unit 102.

The optical deflector 101 is composed of an electro-optical material with a trap in a paraelectric phase and being for accumulating charge within the material. The optical axis of the incident light on the optical deflector 101 is set orthogonal to the direction of the electric field of the voltage applied to the optical deflector 101. A voltage is applied to the optical deflector 101 to deflect incident light incident on the optical deflector 101. Examples of such an electro-optical material include KTN [$KTa_{1-\alpha}Nb_\alpha O_3$ ($0<\alpha<1$)] crystals or KLTN [$K_{1-\beta}Li_\beta Ta_{1-\alpha}Nb_\alpha O_3$ ($0<\alpha<1$, $0<\beta<1$)] crystals with lithium.

The storage unit 103 stores a goal voltage $V=g_{goal}(t)$, which provides a deflection angle θ with the goal time dependency $\theta=\theta_{goal}(t)$.

Figure 2:
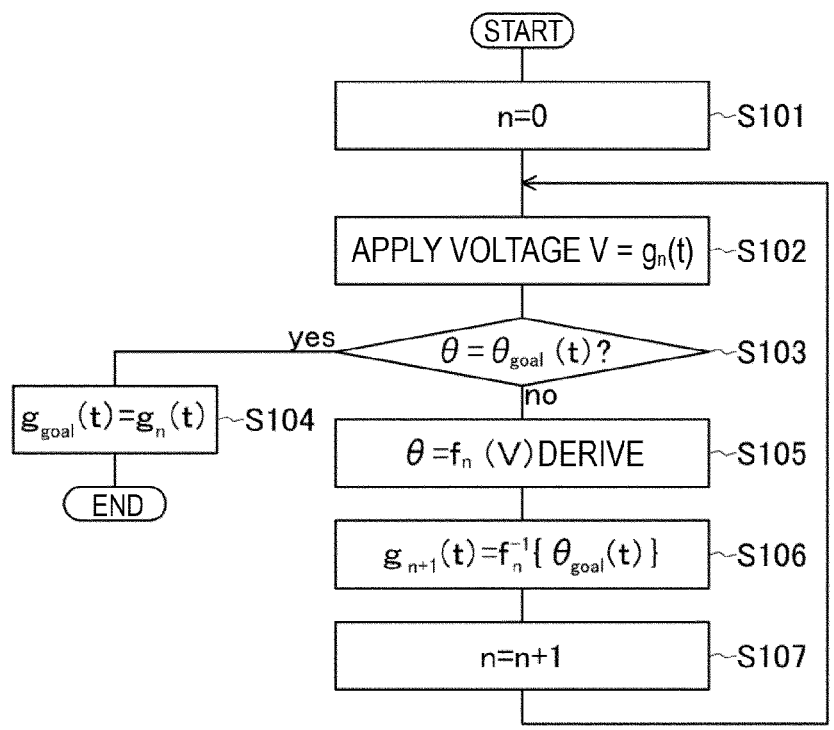
FIG. 2 is a flowchart for describing a method for controlling an optical deflector according to an embodiment of the present invention.

Hereinafter, a method for deriving a goal voltage $g_{goal}(t)$ (a method for controlling the optical deflector) stored by the storage unit 103 will be described with reference to the flowchart of FIG. 2. This method for derivation (the method for controlling the optical deflector) is to derive the voltage $V=g_{goal}(t)$, which provides the time dependency $\theta=\theta_{goal}(t)$ of the goal deflection angle. With the deflection angle θ and the voltage V as a periodic function of time with a certain period T, and in evaluating whether the deflection angle has changed in the desired time and in deriving an inverse function, $0 \leq t < T$ is considered as a definition region of t.

First, in step S101, the number of repetitions n=0 is set (initial step). Next, at step S102, certain $g_n(t)$ having a period T is applied to the optical deflector 101 (step $A_n$). For example, a "DC bias voltage+sine wave voltage" is applied to the optical deflector 101.

Next, in step S103, it is confirmed whether $\theta=\theta_{goal}(t)$ is satisfied with goal accuracy (step $B_n$). Here, an evaluation is made whether the deflected light has a trajectory with the desired time dependency. In other words, an evaluation is made whether the deflection angle has made a desired time change represented by Equation (5) below.

The evaluation of whether the deflection angle has made the desired time change represented by Equation (5) can be achieved by a variety of methods. For example, the evaluation can be made by plotting the experimental results of the time dependency of the deflection angle on a graph and visually determining by humans from the resulting graph. The evaluation described above can be made, for example, depending on whether the maximum value of the absolute value of the difference at each time of $\theta_{goal}(t)$ with the experimental results of the time dependency of the deflection angle is less than or equal to a desired threshold value appropriately defined. The evaluation described above can also be made, for example, depending on whether the average value of the absolute value of the difference at each time of $\theta_{goal}(t)$ with the experimental results of the time dependency of the deflection angle is less than or equal to a desired threshold value appropriately defined.

In a case where, in step S103, $\theta=\theta_{goal}(t)$ is satisfied with the goal accuracy (yes in step S103), then in step S104, $g_n(t)$ is set to the goal voltage $g_{goal}(t)$ (step $C_n$) and the process ends. Note that the voltage dependency of the deflection angle depends on the time dependency of the applied voltage.

On the other hand, in step S103, in a case where $\theta=\theta_{goal}(t)$ is not satisfied with the goal accuracy (no in step S103), then in step S105, $\theta=f_n(V)$ indicating the voltage dependency of the deflection angle θ is derived (step $D_n$). Next, in step S106, $g_{n+1}(t)=f_n^{-1}\{\theta_{goal}(t)\}$ is set (step $E_n$). Next, in step S107, n=n+1 is set as an increment step (step $F_n$) and the process returns to step S102. Each of the steps described above continues until $\theta=\theta_{goal}(t)$ is satisfied with the goal accuracy.

Figure 3:
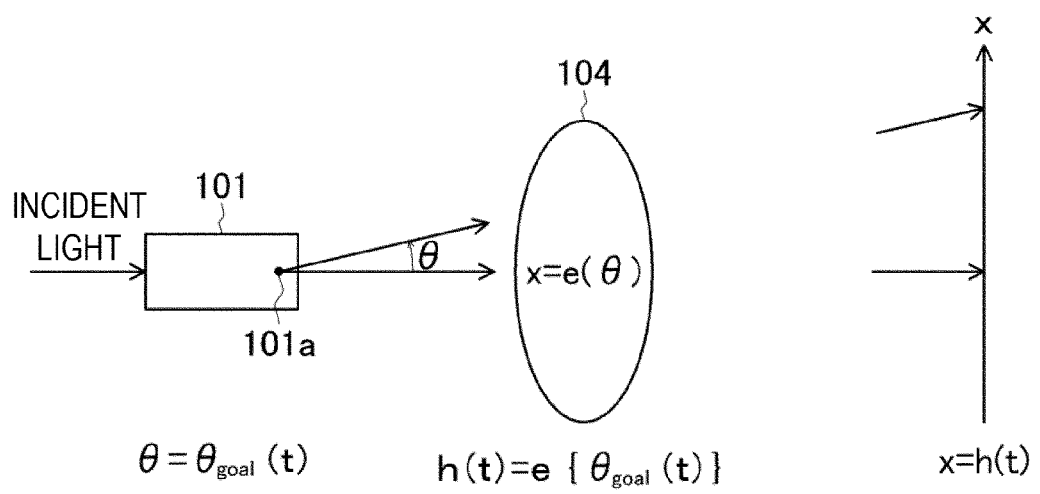
FIG. 3 is an explanatory diagram for describing a position x of an output destination of light incident on the optical system 104 output from the optical deflector 101 and output from the optical system 104.

Hereinafter, more details will be described. FIG. 3 is a diagram for describing a position x of an output destination of light incident on an optical system 104 output from the optical deflector 101 and output from the optical system 104. Suppose that the light emitted from the center of rotation (pivot) 101a of the optical deflector 101 is required to indicate, after passing through the optical system 104 composed of optical components such as lenses, mirrors, and the like, the time dependency described by the function h(t) of the period T such as "x=h(t) . . . (1)" on the x-axis.

For example, in a case where x is required to show simple harmonic motion, h(t) can be expressed as "$h(t)=x_0 \sin(\omega t + \gamma) + x_2$ . . . (2)". Note that in Equation (2), $x_0$ is the amplitude, is the angular frequency, and γ is the initial phase. $x_2$ is a constant, and in this case, is the central position of the simple harmonic motion. The period T is $2\pi/\omega$.

For example, in a case where x is required to show a straight trajectory at an equal speed of speed v, h(t) can be expressed as "$h(t)=vt+x_2$ . . . (3)". In Equation (3), $x_2$ is a constant, and in this case, is a position at time t=0.

Meanwhile, the position at which the light beam reaches on the x-axis is determined by the incident angle θ on the optical system 104. In other words, x is a function of θ, which is expressed as x=e(θ). Then, assuming that the time dependency of the deflection angle θ that shows the desired trajectory x=h(t) is θ=θ$_{goal}$(t), the equation "h(t)=e{θ$_{goal}$(t)} . . . (4)" is satisfied. Solving Equation (4) inversely holds "θ$_{goal}$(t)=e$^{-1}$ {h(t)} . . . (5)".

The function e may be known because it is determined by the characteristics and the arrangement of the optical components that are used. Thus, if the desired trajectory h(t) is determined, θ$_{goal}$(t) is determined from Equation (5). It is not critical to select what type of optical system 104 is to be selected, and in one optical system 104, a voltage may be determined to achieve the desired deflection angle θ=θ$_{goal}$(t).

Figure 4:
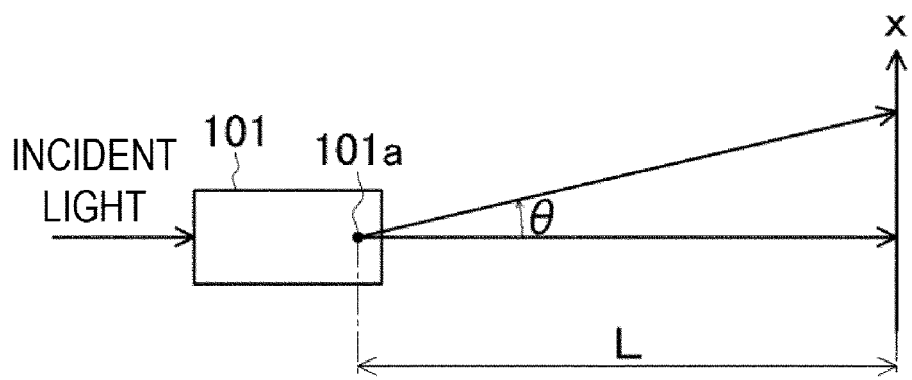
FIG. 4 is a configuration diagram illustrating a configuration in a case of a space where the distance from a pivot 101a to the position x of the light output destination is L, as the optical system 104 illustrated in FIG. 3.

Thus, as the optical system 104, a method for determining a voltage such that θ=θ$_{goal}$(t) assuming the space where the distance from the pivot 101a illustrated in FIG. 4 to the x-axis is L.

Suppose that the position of the light that has been transmitted without being deflected by the optical deflector 101 is set as x=0. By means of the optical deflector, the position of the light at which the deflection angle θ is provided can be expressed as "x=e(θ)=L tan θ . . . (6)".

In Equation (6), in a case where θ is sufficiently small, it can be approximated as "x=e(θ)≈Lθ . . . (7)". For example, when θ=7.5 degrees (=0.1309 rad=130.9 mrad), tan θ=0.1317, so tan θ/θ=1.006, and thus Equation (7) may be satisfied if around 0.6% of error is permitted. When θ=10 degrees (=0.1745 rad=174.5 mrad), tan θ=0.1763, so tan θ/θ=1.01, and thus Equation (7) may be satisfied if around 1% of error is permitted. When θ=15 degrees (=0.2618 rad=261.8 mrad), tan θ=0.2679, so tan θ/θ=1.02, and thus Equation (7) may be satisfied if around 2% of error is permitted.

Hereinafter, Equation (7) is considered to be satisfied. The deflection angle θ giving Equation (1) is θ$_{goal}$(t), so by rearranging with the relationship where Equation (1) and Equation (7) are equal, θ$_{goal}$(t) can be expressed as "θ$_{goal}$(t)=h(t)/L . . . (8)". Comparing Equation (5) with Equation (8), it can be seen that in this case, function e$^{-1}$ is 1/L.

Figure 5A:
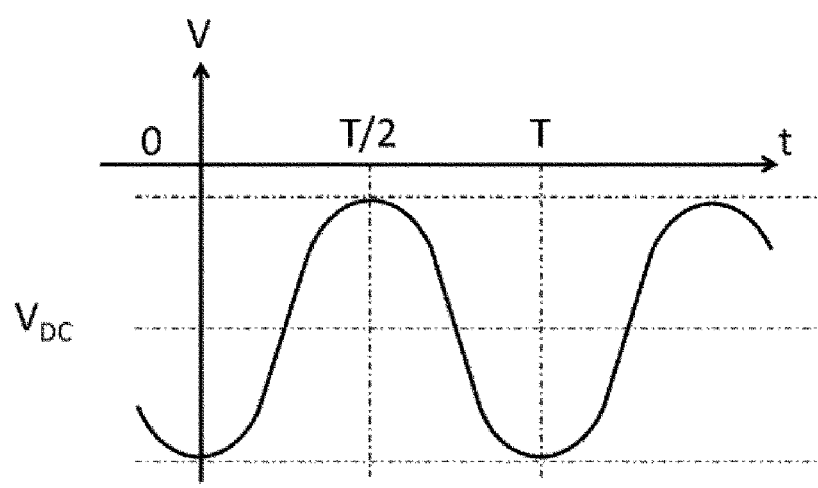
FIG. 5A is a characteristic diagram illustrating an example of a voltage V which a voltage control unit 102 applies (outputs) to the optical deflector 101.
Figure 5B:
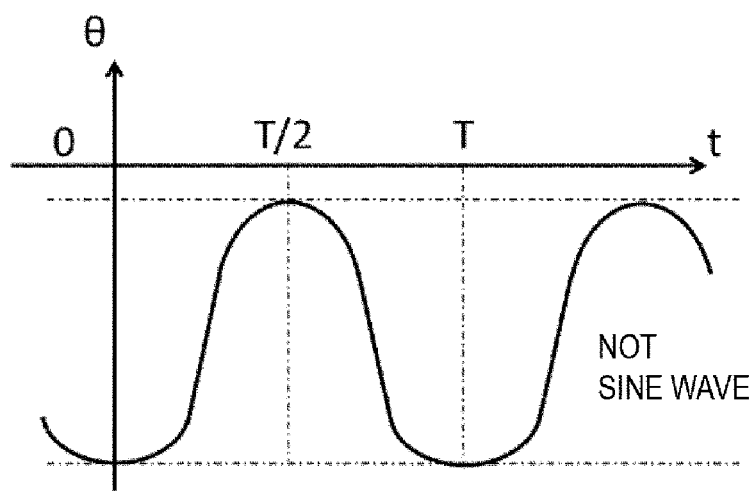
FIG. 5B is a characteristic diagram illustrating a change in a deflection angle $\theta$ obtained as a result of the voltage control unit 102 applying the voltage V illustrated in FIG. 5A to the optical deflector 101.
Figure 5C:
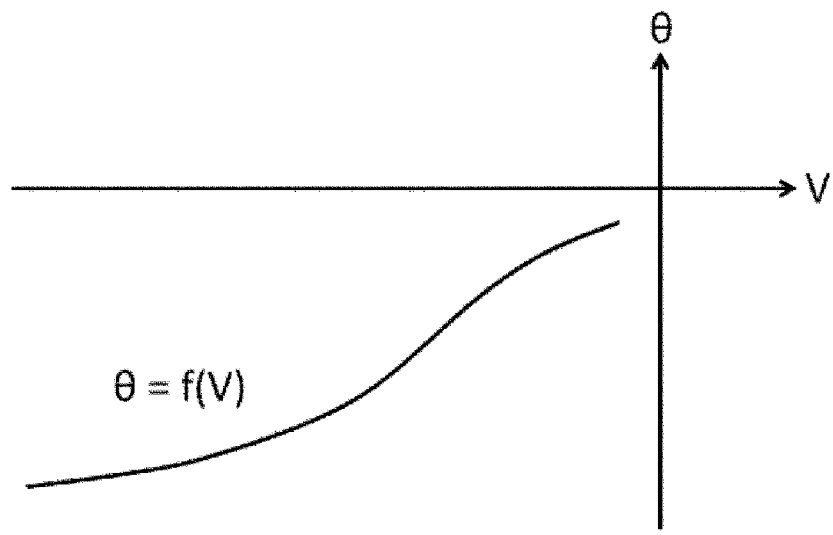
FIG. 5C is a characteristic diagram illustrating the relationship between the instantaneous voltage V and the deflection angle $\theta$ in a case where a change in the deflection angle $\theta$ illustrated in FIG. 5B is obtained as a result of the voltage control unit 102 applying the voltage V illustrated in FIG. 5A to the optical deflector 101.

Consider the case where, for example, the DC bias voltage V$_{DC}$+the sine wave voltage (period T) is applied as the voltage V which the voltage control unit 102 applies (outputs) to the optical deflector 101 as illustrated in FIG. 5A, and the resulting deflection angle θ has changed as in FIG. 5B. From FIGS. 5A and 5B, the relationship between voltage and deflection angle can be graphed by plotting (instantaneous) voltage V on the horizontal axis and (instantaneous) deflection angle θ on the vertical axis. In this case, the relationship between the voltage and the deflection angle is as illustrated in FIG. 5C. In other words, the deflection angle θ can be expressed as a function of the instantaneous voltage V as θ=f(V).

Figure 6A:
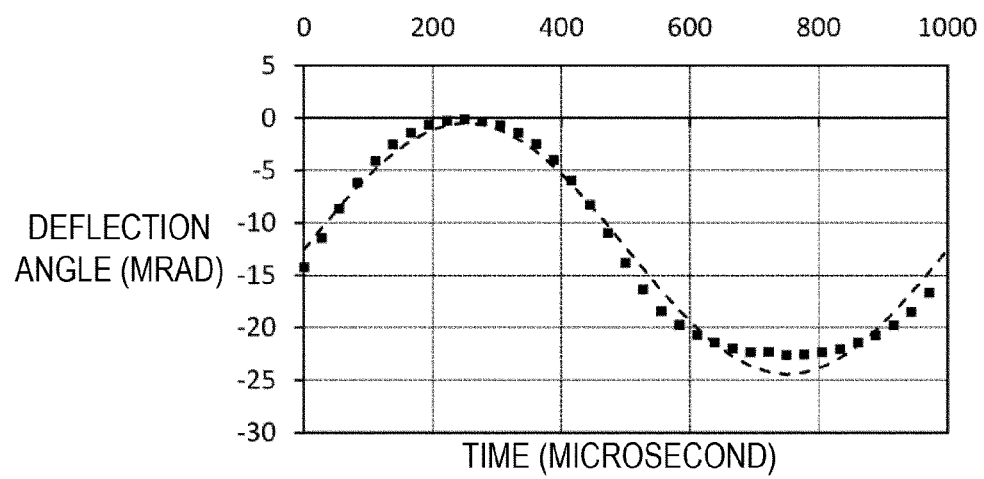
FIG. 6A is a characteristic diagram in which each point in FIG. 6A is a deflection angle at each voltage application time obtained by actually applying a superimposed voltage of a DC bias voltage=−375 V and a sine wave (1 kHz) with an amplitude of 290 V, to the KTN crystal, and the dotted line illustrates a curve obtained by fitting the points with a sine wave.
Figure 6B:
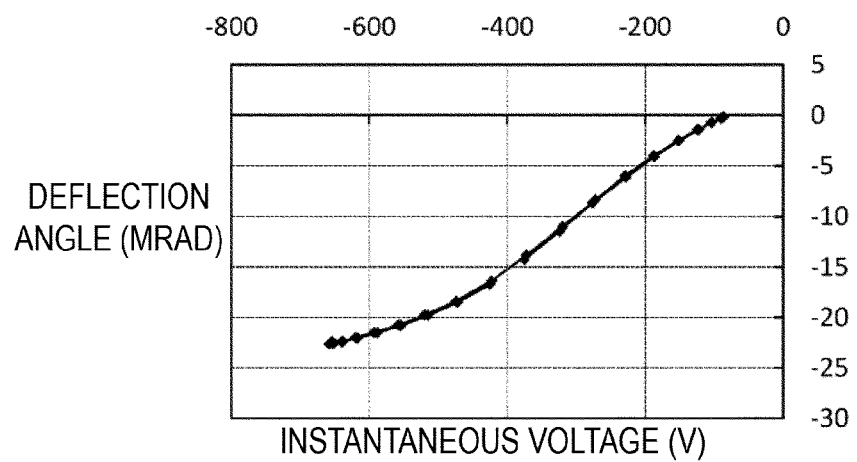
FIG. 6B is a characteristic diagram illustrating instantaneous voltage dependency of the deflection angle obtained by actually applying a superimposed voltage of a DC bias voltage=−375 V and a sine wave (1 kHz) with an amplitude of 290 V, to the KTN crystal.

FIGS. 6A and 6B illustrate the results obtained by actually applying a superimposed voltage of a DC bias voltage=−375 V and a sine wave (1 kHz) with an amplitude of 290 V, to the KTN crystal. Each point in FIG. 6A is a deflection angle at each time. The dotted line in FIG. 6A is a curve obtained by fitting the points with a sine wave. FIG. 6B shows voltage dependency of the deflection angle.

If the voltage V and the deflection angle θ have a linear relationship, if a DC bias voltage+sine wave voltage is applied as the voltage V, θ changes in a sinusoidal manner. Thus, from Equation (8), the trajectory of the light x=h(t) shows simple harmonic motion. However, as is apparent from FIG. 6B, θ and V are not in a linear relationship. That is, in a case where a DC bias voltage+sine wave voltage is applied to the optical deflector having the characteristics illustrated in FIGS. 6A and 6B, the trajectory of the light does is not simple harmonic motion. In fact, each point is not on the fitting curve in FIG. 6A.

Similarly, if the voltage V and the deflection angle θ have a linear relationship, in a case where a triangle wave or sawtooth wave is applied as the voltage V, θ changes linearly with respect to time. However, if θ and V are not in a linear relationship as in FIG. 6B, in a case where a triangle wave or sawtooth wave is applied, the trajectory of the light does not show a straight trajectory at an equal speed.

Depending on the application conditions of the voltage, the distribution of charge injected into the electro-optical crystals may vary. That is, the charge distribution in the crystal depends on the voltage V=g(t). Because the deflection angle depends on the charge distribution, θ=f(V) depends on g(t). That is, the graph obtained in FIG. 6B changes depending on the voltage V=g(t).

Figure 6C:
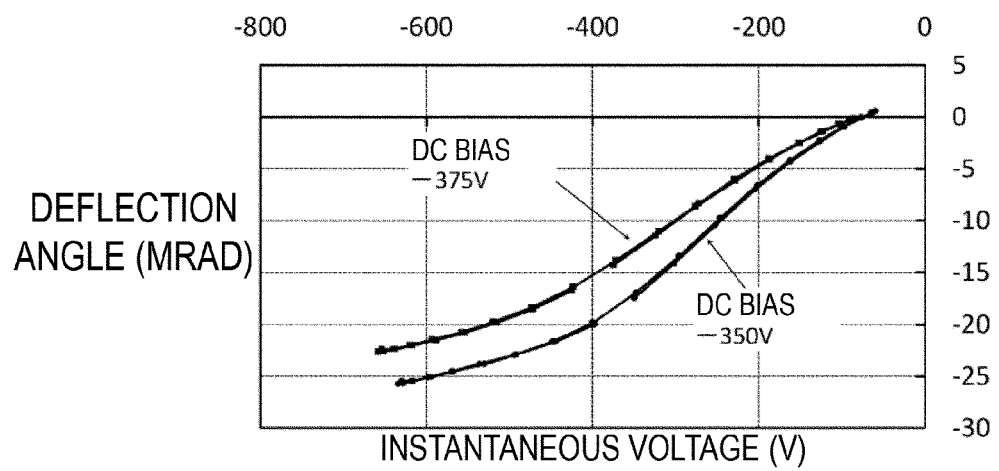
FIG. 6C is a characteristic diagram illustrating the experimental results of instantaneous voltage dependency of the deflection angle obtained by actually applying a superimposed voltage of a DC bias voltage (−375V, −350V) and a sine wave (1 kHz) with an amplitude 290 V to the KTN crystal.

FIG. 6C illustrates the experimental results of voltage dependency of the deflection angle obtained by actually applying a superimposed voltage of a DC bias voltage and a sine wave (1 kHz) with an amplitude 290 V to the KTN crystal. −375 V and −350 V are selected and compared as DC bias. As is apparent from this graph, the two curves do not overlap. That is, it can be seen that θ=f(V) depends on V=g(t).

As described above, if the voltage signal V=g(t) is provided, by measuring the deflection angle, the deflection angle θ can be expressed as a function of the instantaneous voltage V as θ=f(V). Thus, the deflection angle θ can be generally expressed as "θ=f{g(t)} . . . (9)", as a function of the time t.

Here, suppose that there are voltages V such that the deflection angle θ is Equation (8) under the condition of θ=f$_0$(V). Assuming that this voltage is g$_1$(t), "θ$_{goal}$(t)=f$_0${g$_1$(t)} . . . (10) is satisfied. That is, "g$_1$(t)=f$_0$$^{-1}${θ$_{goal}$(t)}" . . . (11)" is satisfied. In other words, in a case of assuming that the instantaneous voltage dependency "θ=f$_0$(V)" is not dependent on the applied voltage g(t), by "V=f$_0$$^{-1}${$_{goal}$(t)}" substituting θ$_{goal}$(t) of Equation (8) as θ in V=f$_0$$^{-1}$(θ) obtained by inversely solving θ=f$_0$(V) experimentally determined, the voltages g$_1$(t) in which x shows a trajectory with desired time dependency can be determined (step E$_{n=0}$).

Figure 7A:
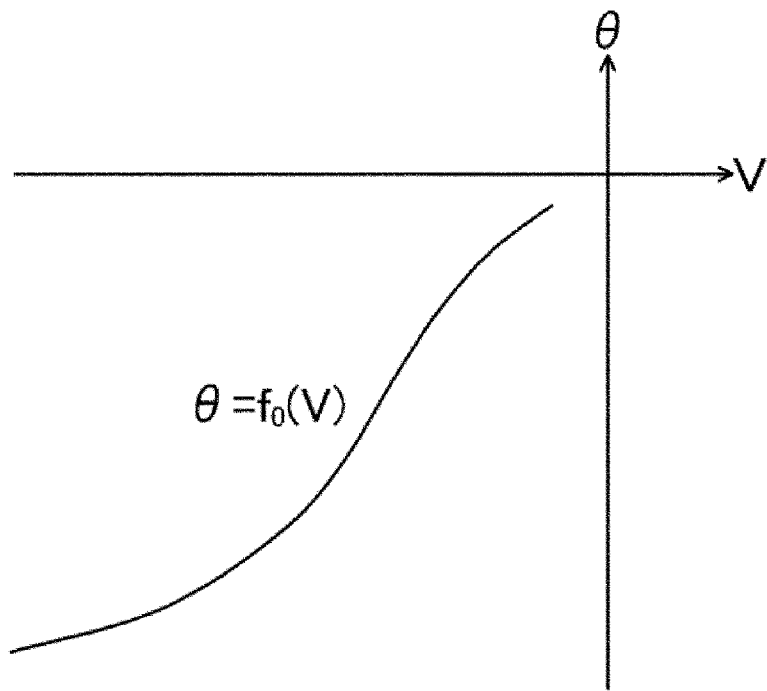
FIG. 7A is a characteristic diagram illustrating an example of $\theta=f_0(V)$.
Figure 7B:
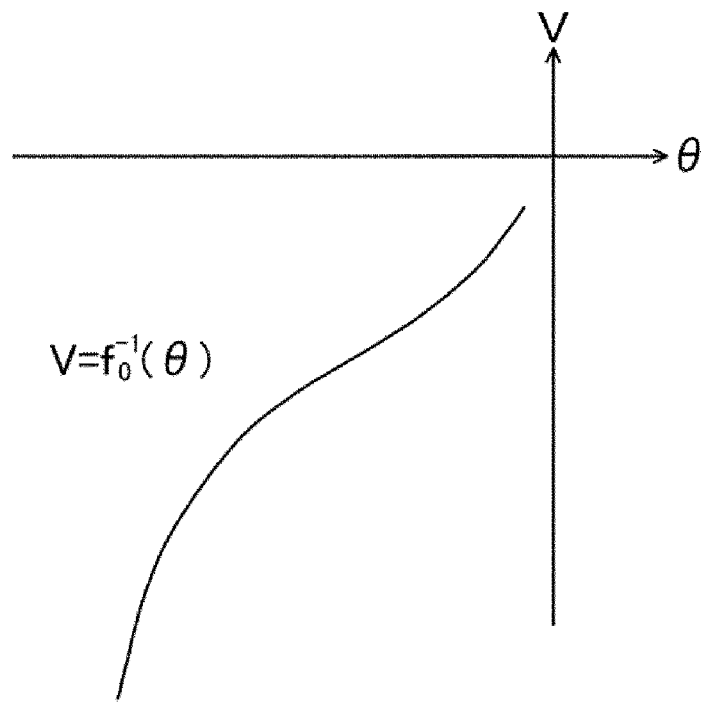
FIG. 7B is a characteristic diagram illustrating an inverse function $V=f_0^{-1}(\theta)$ of FIG. 7A.

FIGS. 7A and 7B illustrate an example of θ=f$_0$(V) and V=f$_0$$^{-1}$(θ). By rotating the entire graph of θ=f$_0$(V) of FIG. 7A by 90 degrees in a counterclockwise direction, and by inverting the 0 axis, V=f$_0$$^{-1}$(θ) of FIG. 7B is obtained.

As previously mentioned, generally θ=f(V) depends on g(t). However, if the shape of g(t) is similar, the shape of θ=f(V) should also be similar. Thus, by repeating the actual applying of the voltage g$_{n+1}$(t) obtained in step E$_n$, and the deriving of θ=f$_{n+1}$(V) at the step D$_{n+1}$, g$_n$(t) and f$_n$(t) are converged, and the deflection angle θ satisfies Equation (8), and as a result, a voltage condition in which x has the desired time dependency can be obtained. Note that, because it is not practical to repeat indefinitely (n→∞), the procedure is repeated until θ actually indicates the desired time dependency with the desired accuracy.

The voltage g$_1$(t) obtained in the step E$_{n=0}$ is actually applied (step A$_{n=1}$), and an evaluation is made as to whether the time dependency of the centroid position of the deflection light is desired (step B$_{n=1}$). In a case where the time dependency of the centroid position of the deflection light is desired, the voltage g$_1$(t) obtained in step E$_{n=0}$ is the voltage signal V=g$_{goal}$(t) to be determined (step C$_{n=1}$). In a case where the time dependency of the centroid position of the deflection light is not desired, "θ=f$_1$(V)" indicating the instantaneous voltage dependency of the deflection angle θ is derived (step D$_{n=1}$). Here, suppose that there are voltages V such that the deflection angle is Equation (8) under the condition of $\theta=f_1(V)$. Assuming that this is $g_2(t)$, then "$g_2(t)=f_1^{-1}\{\theta_{goal}(t)\}$ . . . (12) (step $E_{n=1}$) is satisfied.

By repeating the steps described above, the voltage condition $g_n$ can be expressed as "$g_n(t)=f_{n-1}^{-1}\{\theta_{goal}(t)\}$ . . . (13)" (step $E_{n-1}$).

Hereinafter, more details will be described using examples.

Example 1

First, Example 1 will be described. When the voltage illustrated in FIG. 5A is applied to the optical deflector 101, the optical deflector 101 has the characteristics of FIGS. 5B and 5C. The applied voltage is determined in which the deflection light output from the optical deflector 101 having such characteristics shows the simple harmonic motion described in Equation (2). The deflection angle at that time can be described as "$\theta_{goal}(t)=h(t)/L=\{x_0 \sin(\omega t+\gamma)+x_2\}/L=(x_0/L)\sin(\omega t+\gamma)+x_2/L$ . . . (14)", substituting Equation (2) into Equation (8).

Figure 8A:
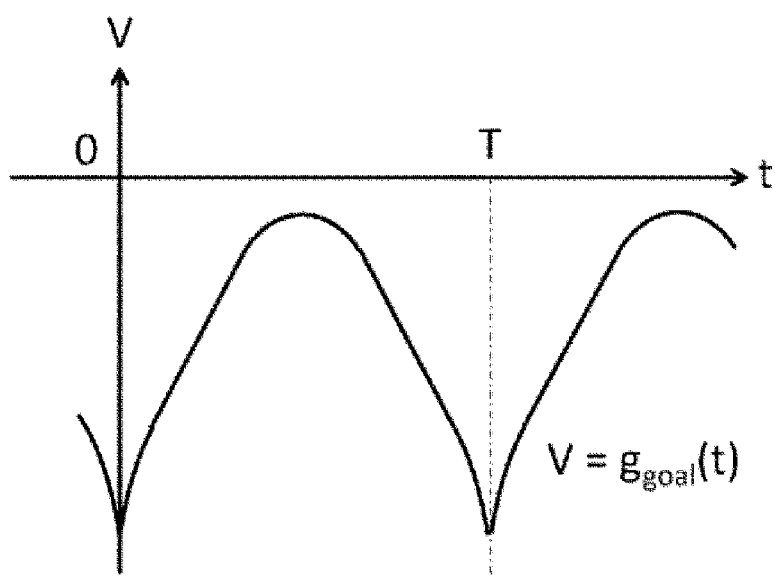
FIG. 8A is a characteristic diagram illustrating the time dependency of a goal applied voltage determined in Example 1.
Figure 8B:
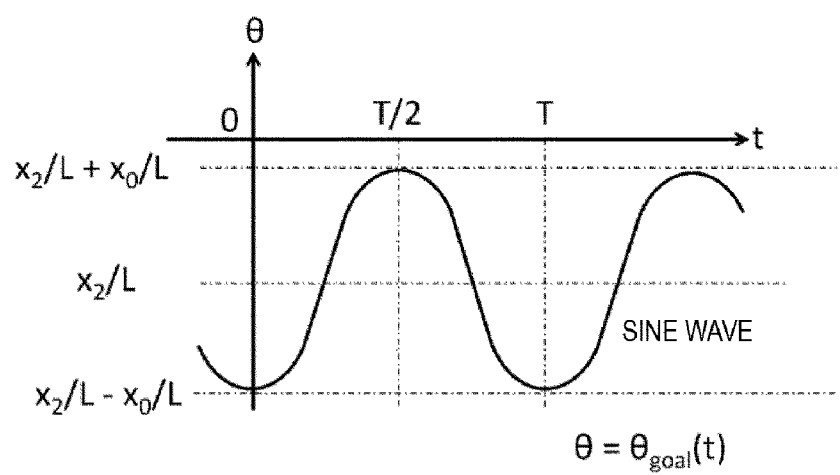
FIG. 8B is a characteristic diagram illustrating the time dependency of the deflection angle obtained in a case of applying the applied voltage illustrated in FIG. 8A.

The maximum value of the absolute value of the deflection angle represented by Equation (14) is $\max|\pm x_0/L+x_2/L|$. For example, when $x_0>0$, $L>0$, $x_2<0$, $\max|\pm x_0/L+x_2/L|=|-x_0/L+x_2/L|$. In a case where this value is sufficiently small, Equation (7) can be applied. For example, with $\gamma=-\pi/2$, $g_n(t)$ is determined by the method for controlling the optical deflector of the embodiment. The voltage $g_{n+1}$ obtained in the step $E_n$ can be expressed as "$g_n(t)=f_{n-1}^{-1}\{(x_0/L)\sin(\omega t-\pi/2)+x_2/L\}$ . . . (15)" by substituting Equation (14) into Equation (13), where $\gamma=-\pi/2$. The obtained applied voltage is illustrated in FIG. 8A, and when this voltage is applied, the deflection angle has the time dependency of sine wave as illustrated in FIG. 8B.

Here, changes in the origin of the deflection angle will be described. As mentioned above, a DC voltage to fill a trap in electro-optical crystals with electrons is superimposed as a bias voltage in applying an AC voltage for fast deflection to the electro-optical crystal. Thus, if the deflection angle $\theta$ of the light that has been transmitted without being deflected by the optical deflector is set as the origin ($\theta=0$), $\theta$ changes in time around an angle other than the origin, as illustrated in FIG. 8B, for example. As a result, the maximum value of the absolute value of $\theta$ ($|x_2/L-x_0/L|$ in FIG. 8B) increases, so the accuracy of approximation of Equation (7) becomes poor.

Figure 9A:
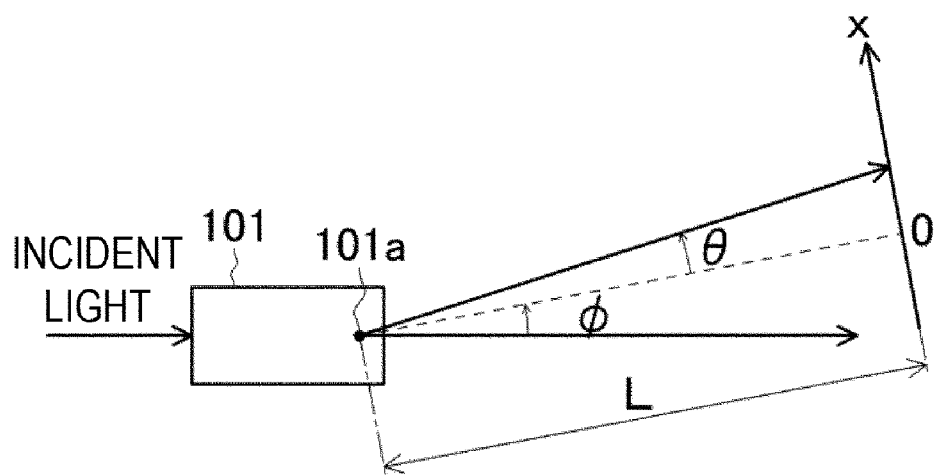
FIG. 9A is a configuration diagram illustrating a case in which the origin of the deflection angle is offset by an angle φ.

In order to increase the accuracy of the approximation described above, the origin of the deflection angle $\theta$ may be set near the center of the deflection angle that changes in time. This configuration can reduce the maximum value of the absolute value of the deflection angle. FIG. 9A illustrates a case where the origin of the deflection angle is offset by an angle cp. The position of the light that the light deflected at the angle reaches is set to $x=0$. By means of the optical deflector, the position of the light at which the deflection angle $\theta$ is provided can be expressed as "$x=e(\theta)=L \tan \theta$ . . . (16)". If $\theta$ is sufficiently small, "$x=e(\theta) \approx L\theta$ . . . (17)" is satisfied. Because Equations (16) and (17) are represented by the same equations as Equations (6) and (7) respectively, the following discussion holds the same discussion above.

Example 2

Next, Example 2 is described. FIG. 8B, which is illustrated in the description of Example 1, is time dependency of the deflection angle prior to resetting the origin of the deflection angle. When $x_0>0$, $L>0$, $x_2<0$, the maximum value of the absolute value of the deflection angle is "$|-x_0/L+x_2/L|$". For example, when "$x_0/L=-x_2/L$", the maximum value of the absolute value of the deflection angle is $2x_0/L$.

Figure 9B:
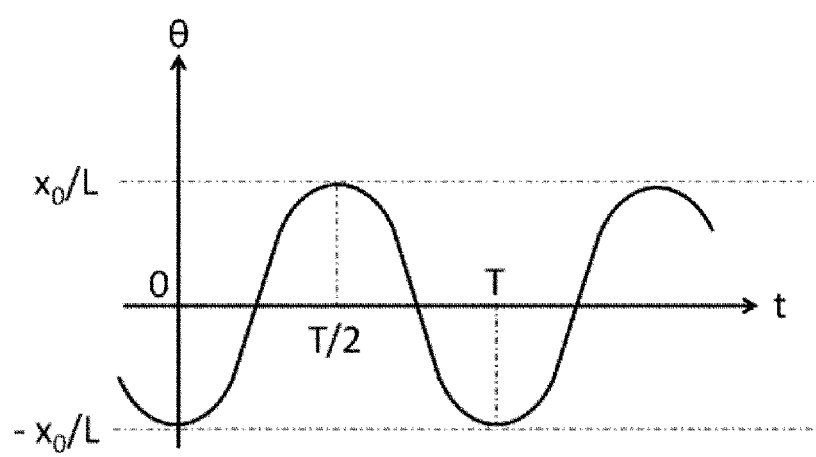
FIG. 9B is a characteristic diagram illustrating the time dependency of the deflection angle in Example 2.

By using the same optical deflector to reset the origin of the deflection angle so that the central position $x_2$ of the simple harmonic motion is at the origin, the value of the voltage $g_{goal}(t)$ is determined by using the control method of the embodiment, and by applying the determined voltage of $g_{goal}(t)$ to the optical deflector 101, the state illustrated in FIG. 9B is obtained as the time dependency of the deflection angle. The maximum value of the absolute value of the deflection angle is $|x_0/L|$. When $x_0>0$, $L>0$, $|x_0/L|=x_0/L$. This is a half value as compared to prior to that resetting the origin of the deflection angle. If the maximum values of the absolute values of the respective deflection angles after resetting and before resetting the origin of the deflection angle are, for example, 7.5 degrees and 15 degrees, the errors are approximately 0.6% and approximately 2%, respectively, as mentioned above. In other words, in a case of using Equation (17), the position accuracy can be increased by resetting the origin of the deflection angle.

Example 3

Next, Example 3 is described. When the voltage illustrated in FIG. 5A is applied to the optical deflector 101, the optical deflector 101 has the characteristics of FIGS. 5B and 5C. The applied voltage is determined in which the deflection light output from the optical deflector 101 shows a uniform velocity motion with the period of T described in Equation (3). The deflection angle at that time can be described as "$\theta_{goal}(t)=h(t)/L=(vt+x_2)/L=(v/L)t+x_2/L$ . . . (18)", substituting Equation (3) into Equation (8).

Figure 10A:
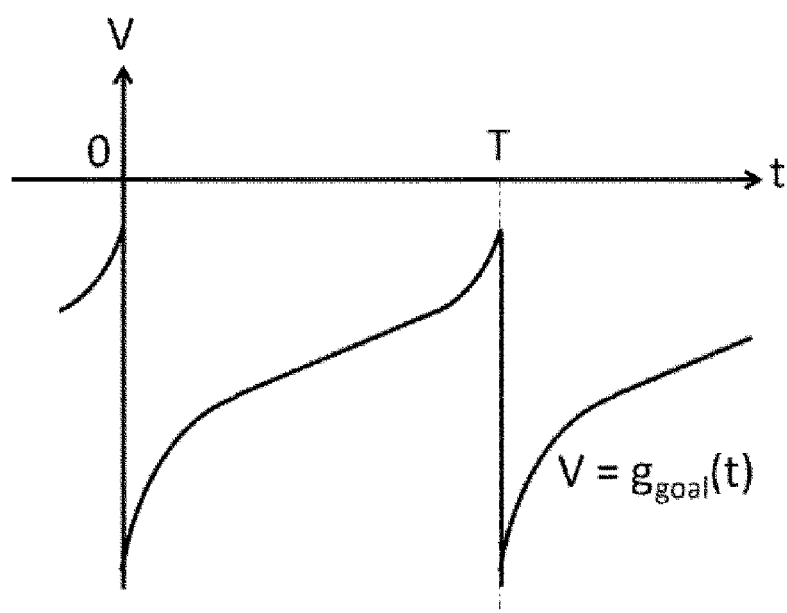
FIG. 10A is a characteristic diagram illustrating the time dependency of the goal applied voltage determined in Example 3.
Figure 10B:
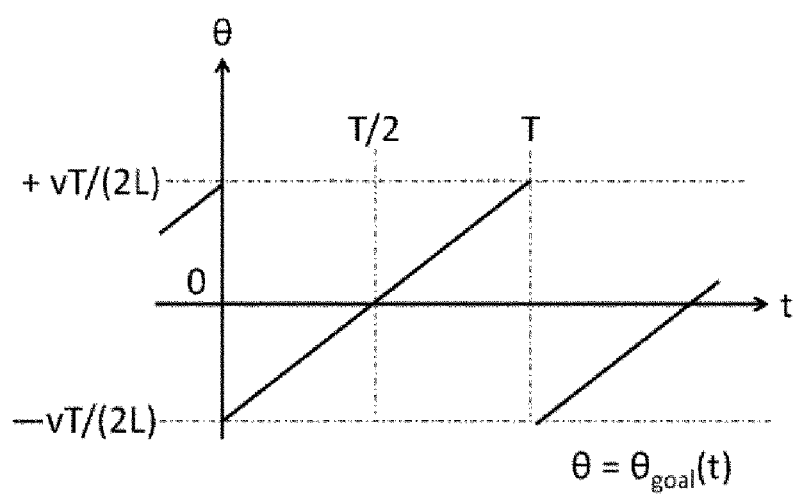
FIG. 10B is a characteristic diagram illustrating the time dependency of the deflection angle in Example 3.
Figure 11:
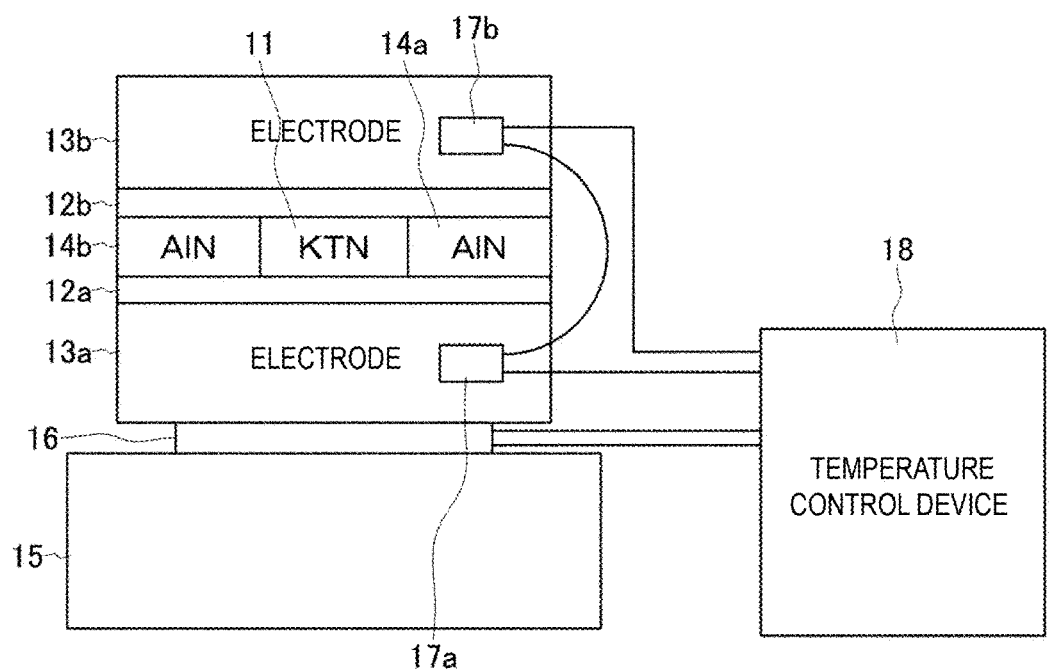
FIG. 11 is a configuration diagram illustrating a configuration of a conventional optical deflector using KTN crystals.

If the origin of the deflection angle is chosen such that $x_2=-vT/2$, as illustrated in FIG. 10B, $$\theta_{goal}(O) = -vT/(2L), \lim_{t \to T-0} \theta_{goal}(t) = +vT/(2L)$$

is satisfied, and the center position of the uniform velocity motion is the origin. The control method according to the embodiment is used after resetting the origin in this way. The voltage $g_n$ obtained in the step $E_n$ can be represented by "$g_n(t)=f_{n-1}^{-1}\{(v/L)t-(vT)/(2L)\}$ . . . (19)" by substituting Equation (18) into Equation (13) where $x_2=-vT/2$.

The applied voltage obtained in this way is illustrated in FIG. 10A, and when this voltage is applied, the deflection angle has the linear time dependency illustrated in FIG. 10B.

If the deflection angle $\theta$ is sufficiently small, Equation (7) is satisfied, but a case in which Equation (6) is used without approximation will now be described. The deflection angle $\theta$ that satisfies Equation (1) is $\theta_{goal}(t)$, so by rearranging with the relationship where Equation (1) and Equation (6) are equal, "$\theta_{goal}(t)=\tan^{-1}\{h(t)/L\}$ . . . (20)" is satisfied as an equation corresponding to Equation (8). Other configurations are similar to the above.

Note that, in the case of a typical optical system, Equation (5) can be used as an equation corresponding to Equation (8). Other configurations are similar to the above.

Note that the optical deflector can also be configured with an electro-optical crystal (KTN crystal) by which an optical deflection phenomenon occurs and a light irradiation unit that irradiates light to the optical crystal. Furthermore, the optical deflector is not limited to an electro-optical crystal, and the optical deflector can be configured such that the voltage dependency $\theta=f(V)$ of the deflection angle depends on the time dependency of the voltage $g(t)$. Although the above describes a periodic function of time as the deflection angle and voltage, when the desired deflection is started and ended after a finite period of time, without repeating periodically, the control method described with respect to the periodic function can be applied by setting the start time of the desired deflection to t=0, and the end time to t=T, with T as the duration.

As described above, according to embodiments of the present invention, the step of applying $g_n(t)$ configured by $g_{n+1}(t)=f_n^{-1}\{\theta_{goal}(t)\}$ to the optical deflector to achieve $\theta=\theta_{goal}(t)$ is repeated until $\theta=\theta_{goal}(t)$ indicating the time dependency of the deflection angle is satisfied with the goal accuracy, so that the position (trajectory) of the light deflected by the optical deflector has the desired time dependency.

Note that, the present invention is not limited to the embodiments described above, and it is obvious that many modifications and combinations can be implemented by a person having ordinary knowledge in the field within the technical spirit of the present invention.

REFERENCE SIGNS LIST

101 Optical deflector
102 Voltage control unit
103 Storage unit.

The invention claimed is:

1. A method for controlling an optical deflector that changes a deflection angle depending on a voltage to be applied, the method for controlling the optical deflector deriving a goal voltage $V=g_{goal}(t)$ for providing a deflection angle $\theta$ with goal time dependency $\theta=\theta_{goal}(t)$ when time is denoted by t, the method comprising:
an initial step comprising:
setting a period of a periodic function of time as T when $\theta$ is the periodic function of time, a period is denoted by T;
setting a duration as T and setting a start time of the deflection angle $\theta$ with the goal time dependency $\theta=\theta_{goal}(t)$ as t=0 when $\theta$ is not a periodic function of time; and
setting a number of repetitions as n=0 when time in a period 0≤t<T is considered;
an increment step of setting n=n+1;
a step $A_n$ of applying a voltage $g_n(t)$ with the period T or the duration T to the optical deflector;
a step $B_n$ of checking whether $\theta=\theta_{goal}(t)$ is satisfied with a goal accuracy, adjacent to the step $A_n$;
a step $C_n$ of setting $g_n(t)$ as the goal voltage $V=g_{goal}(t)$;
a step $D_n$ of deriving a relationship of voltage dependency $\theta=f_n(V)$ of the deflection angle;
a step $E_n$ of setting $g_n+1(t)=f_{n-1}\{\theta_{goal}(t)\}$, next to the step $D_n$; and
a step $F_n$ of performing the increment step next to the step $E_n$,
wherein the step $A_n$ is subsequent to the increment step,
wherein in the step $B_n$, in a case where $\theta=\theta_{goal}(t)$ is not satisfied with the goal accuracy, the step $D_n$ is performed following the step $B_n$,
wherein in the step $B_n$, in a case where $\theta=\theta_{goal}(t)$ is satisfied with the goal accuracy, the step $C_n$ is performed following the step $B_n$ and a process is ended, and
wherein the voltage dependency $\theta=f_n(V)$ of the deflection angle depends on a time dependency of an applied voltage.

2. The method for controlling the optical deflector according to claim 1, wherein:
the optical deflector is constituted of an electro-optical material with a trap in a paraelectric phase and being for accumulating charge within the electro-optical material; and
an optical axis of incident light on the optical deflector is set orthogonal to a direction of an electric field of the voltage applied to the optical deflector, and the voltage is applied to the optical deflector to deflect incident light incident on the optical deflector.

3. The method for controlling the optical deflector according to claim 2, wherein the electro-optical material comprises KTN [$KTa_{1-\alpha}Nb_\alpha O_3$ (0<α<1)] crystals or KLTN [$K_{1-\beta}Li_\beta Ta_{1-\alpha}Nb_\alpha O_3$ (0<α<1, 0<β<1)] crystals.

4. An optical deflection device comprising:
an optical deflector configured to change a deflection angle depending on a voltage to be applied;
a voltage controller configured to apply the voltage to the optical deflector; and
a storage device configured to store a value of a voltage output by the voltage controller,
wherein the storage device is configured to store a goal voltage $V=g_{goal}(t)$ for providing a deflection angle $\theta$ with goal time dependency $\theta=\theta_{goal}(t)$ when time is denoted by t, and
the goal voltage V=goal(t) is determined by a method, the method comprising:
an initial step comprising:
setting a period of a periodic function of time as T when $\theta$ is the periodic function of time, a period is denoted by T;
setting a duration as T and setting a start time of the deflection angle $\theta$ with the goal time dependency $\theta=\theta_{goal}(t)$ as t=0 when $\theta$ is not a periodic function of time; and
setting a number of repetitions as n=0 when time in a period 0≤t<T is considered;
an increment step of setting n=n+1;
a step $A_n$ of applying a voltage $g_n(t)$ with the period T or the duration T to the optical deflector;
a step $B_n$ of checking whether $\theta=\theta_{goal}(t)$ is satisfied with a goal accuracy, adjacent to the step $A_n$;
a step $C_n$ of setting $g_n(t)$ as the goal voltage $V=g_{goal}(t)$;
a step $D_n$ of deriving a relationship of voltage dependency $\theta=f_n(V)$ of the deflection angle;
a step $E_n$ of setting $g_n+1(t)=f_{n-1}\{\theta_{goal}(t)\}$, next to the step $D_n$; and
a step $F_n$ of performing the increment step next to the step $E_n$,
wherein the step $A_n$ is subsequent to the increment step,
wherein in the step $B_n$, in a case where $\theta=\theta_{goal}(t)$ is not satisfied with the goal accuracy, the step $D_n$ is performed following the step $B_n$,
wherein in the step $B_n$, in a case where $\theta=\theta_{goal}(t)$ is satisfied with the goal accuracy, the step $C_n$ is performed following the step $B_n$ and a process is ended, and
wherein the voltage dependency $\theta=f_n(V)$ of the deflection angle depends on a time dependency of an applied voltage.

5. The optical deflection device according to claim 4, wherein:
the optical deflector is constituted of an electro-optical material with a trap in a paraelectric phase and being for accumulating charge within the electro-optical material, and an optical axis of incident light on the optical deflector is orthogonal to a direction of an electric field of the voltage applied to the optical deflector, and the voltage is applied to the optical deflector to deflect incident light incident on the optical deflector.

6. The optical deflection device according to claim 5, wherein the electro-optical material comprises KTN [$KTa_{1-\alpha}Nb_\alpha O_3$ ($0<\alpha<1$)] crystals or KLTN [$K_{1-\beta}Li_\beta Ta_{1-\alpha}Nb_\alpha O_3$ ($0<\alpha<1$, $0<\beta<1$)] crystals.

* * * * *